United States Patent

Bercovitz, Jr.

[15] 3,659,196

[45] Apr. 25, 1972

[54] PHASE DETECTOR USING LOGIC GATING CIRCUITS

[72] Inventor: Nathaniel Bercovitz, Jr., Newport Beach, Calif.

[73] Assignee: Collins Radio Company, Dallas, Tex.

[22] Filed: Oct. 26, 1970

[21] Appl. No.: 83,813

[52] U.S. Cl. ..........................................................324/83 A

[51] Int. Cl.....................................G01n 25/00, H03d 13/00

[58] Field of Search........................324/83 D, 83 A; 328/133

[56] References Cited

UNITED STATES PATENTS 3,297,947 1/1967 Riordan et al. ......................324/83 D

*Primary Examiner*—Alfred E. Smith
*Attorney*—R. J. Crawford and B. C. Lutz

[57] ABSTRACT

A phase detection circuit utilizing logic gating elements for providing an output indicative in polarity of the direction of phase deviation from design and indicative in duration or amplitude of the magnitude of phase deviation.

8 Claims, 2 Drawing Figures

Patented April 25, 1972 3,659,196

INVENTOR
NATHANIEL BERCOVITZ

BY Bruce C Lutz
ATTORNEY

PHASE DETECTOR USING LOGIC GATING CIRCUITS

THE INVENTION

The present invention is directed generally toward electronic circuits and more specifically to an electronic phase detector.

The prior art is replete with phase detectors. However, in many instances the output of these phase detectors are hard to filter and for this reason are expensive to build when utilized in a feedback circuit which uses the error indicating output of the detector to adjust some circuit such as a variable frequency oscillator. Further, a small amount of error signal, in the ones that have been designed to reduce output amplitudes near the design angle, is not large enough to adequately affect the load.

With the above inadequacies in mind, the present invention produces an enhancement of the error signal at phase angles near the design angle, which enhancement is proportionally less as error increases. Further, the output is bipolar for easily determining the direction of phase deviation and reduces to zero output with no deviation so that filtering problems are minimized. In a feedback system, using this invention, filtering problems are practically zero because the feedback system will normally keep the phase error to very small amounts. It is therefore an object of the present invention to provide an improved phase detector.

Figure 2:
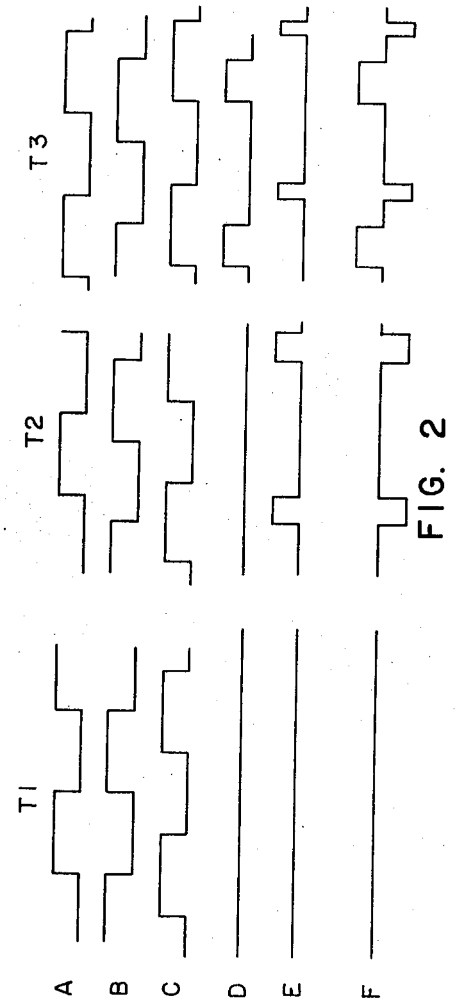
Figure 1:
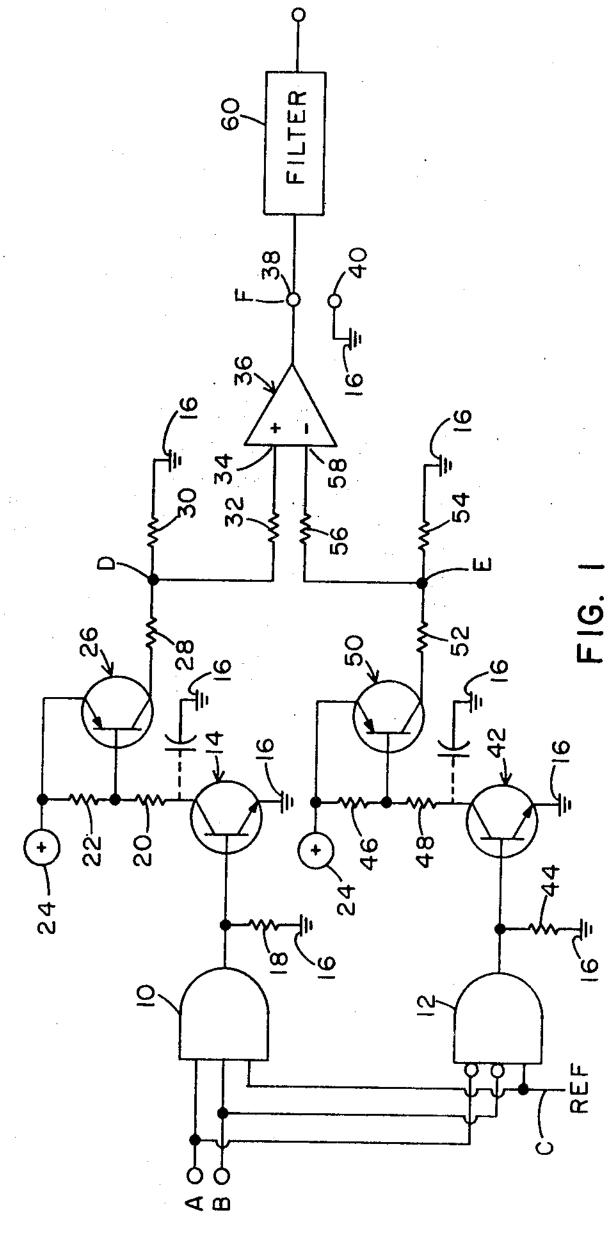

Other objects and advantages of the present invention will be apparent from the reading of the specification and appended claims in conjunction with the drawings wherein:

FIG. 1 is a block schematic diagram of a preferred embodiment of the invention; and FIG. 2 is a set of waveforms utilized in describing the operation of FIG. 1.

In referring to FIG. 1 it will be noted that an AND-gate 10 receives inputs from terminals A and B. A second AND-gate 12 also receives inputs from terminals A and B but are inverted at the inputs of AND-gate 12 such that only one of the two AND gates can have a positive output at any given time. A third input which is received by both AND-gates 10 and 12 in the same condition is labeled reference C. According to standard notation. each of the AND gates will provide a positive output when three positive inputs are supplied thereto. The positive inputs to AND-gate 12 will of course be after input inversion thereof. The output from AND-gate 10 is connected to the base of an NPN-transistor 14 having its emitter connected to ground 16. A resistor 18 is connected between base and emitter of transistor 14. Two resistors 20 and 22 are connected in series between a collector of transistor 14 and a positive power potential 24. A PNP transistor generally designated as 26 has its emitter connected to positive potential 24 and its base connected to a junction between resistors 20 and 22. Two resistors 28 and 30 are connected in series between a collector of transistor 26 and ground 16. A resistor 32 is connected between a junction D intermediate resistors 28 and 30, and a first input 34 of a direct current differential amplifier generally designed as 36. Two output terminals 38 and 40 are connected respectively to an output of amplifier 36 and ground 16. Output 38 is also labeled F for explanatory purposes with FIG. 2. An NPN transistor generally designated as 42 has its emitter connected to ground 16 and its base connected to an output of AND-gate 12 and also to one end of a resistor 44 having its other end connected to ground 16. A pair of resistors 46 and 48 are connected in series between positive potential 24 and a collector of transistor 42. A PNP transistor generally designated as 50 has its emitter connected to positive potential 24 and its base connected intermediate between said resistors 46 and 48. A further pair of resistors 52 and 54 are connected in series between ground 16 and a collector of transistor 50 with an intermediate junction therebetween labeled E. A resistor 56 is connected between junction E and an input 58 of amplifier 36.

Referring to FIG. 2 it will be noted there are three sets of timing diagrams T1, T2, and T3. Although six waveforms A–F are necessary for explanation of the circuit of FIG. 1, waveforms B and C are identical in each instance and are not required for portions T2 and T3 of the illustration. The waveform C may be derived from waveform B since these two waveforms are constant in their phase relationship. In the preferred embodiment disclosed, the difference in phase between waveforms B and C is 90°.

As indicated previously the present invention is a phase detector. As will be apparent to those skilled in the art, the phase detection can be easily modified for providing a minimum output when the two inputs are either in phase or 180° out of phase. As shown, the phase detection is designed for 180° out-of-phase conditions.

As previously indicated the AND-gates 10 and 12 will provide an output only when they receive three simultaneous positive inputs. Under the assumptions of signal phase relationships shown in Section T1 of FIG. 2, there is no instance during which there are three positive inputs to either AND-gate 10 or 12. Proceeding to Section T2 it will be noted that for a short period of time both waveforms A and B are negative while waveform C is positive. Due to inversion at inputs of AND-gate 12 these will be logically received as positive inputs thereby providing an output for a period of time as represented in waveform E. This will turn both transistors 42 and 50 to an ON condition thereby raising the potential at junction E from the normal ground condition to a positive potential so that an output F may be obtained. This may be readily changed to a DC average level through the use of additional filtering means 60 which if desired could be incorporated within the design of amplifier 36. However, filter 60 is disclosed separately for purposes of illustration.

As long as the phase difference between waveforms A and B does not exceed the range from 90° to 270° or plus and minus 90° with respect to the out-of-phase condition, outputs will be obtained from only one of the two AND gates and associated output transistors. However, when this length is exceeded as in Section T3 of FIG. 2, both AND-gates 10 and 12 are actuated each cycle. As the phase difference approaches zero, one of the outputs decreases while the other increases until both are equal.

As designed, the transistors 14 and 26 or 42 and 50 are placed in a saturated condition upon turn-ON by their respective AND gates. As is well known, saturation of a transistor will cause it to turn OFF more slowly after the input is removed than the transistor is turned ON after the input is applied. Thus, there is a slight pulse stretching effect near the phase condition for which the detector is designed to produce a minimum output. This pulse stretching effect can be enhanced by connecting capacitors between the collectors of transistors 14 and 42 and ground or reference potential 16. Since these capacitors are not a necessary part of the circuit the connection has been shown by a dashed line. This pulse stretching provides a nonlinear signal which is emphasized near the design condition and is a suitable output for use in feedback circuits. As will be realized, the circuit will provide a more linear output if transistors having a low storage time or stored charge are used in place of the transistors shown as 14 and 42.

While two transistors have been illustrated for each of the legs between the AND gate and the amplifier 36, it will be readily apparent that other numbers of transistors can be utilized along with changes in circuit configuration to still achieve the inventive concept of logically detecting the occurrence of any phase discrepancy between a pair of input signals and producing an output indicative of the algebraic summation of said logic detection indicative of the phase difference.

As will be apparent to those skilled in the art, where transistors are used they can be replaced by other switching units and in some instances would not even be necessary if the error amplification near zero phase difference is not needed or is provided internal to the logic gating means. Further, other logic units such as NOR gates may be utilized if so desired.

The present invention provides a decreasing pulse width output which is easy to filter, if so desired, when the inputs approach the desired phase condition. These input signal supply a spike to the filter which decreases to zero. Other phase detectors often have high ripple content in their output, thereby filtering problems when approaching the desired phase condition for the input signals being detected. In addition to the fact that the output of the present phase detector is easy to filter, adjustments of the phase detector to provide the minimum output at the design phase are completely eliminated since at the design phase the outputs from the two portions of the circuit are zero. Adjustments may be necessary in the differential amplifier 36 to prevent an output from appearing, if the amplifier is not properly designed, but of course such adjustments are not the problem of the phase detector and can be eliminated by proper amplifier selection. One other possible source of error to the output is timing signal variation due to generation of the complements of the input signals A and B before being supplied to AND-gate 12. This can be compensated for by suitable identical delay prior to supplying the signals in their uncomplemented form to AND-gate 10.

I wish therefore to be limited not by the specific embodiment disclosed but only by the scope of the appended claims.

I claim:

1. The method of logically detecting alteration of relative phase between two signals comprising the steps of:

generating a reference signal having a quadrature phase relationship with respect to one of said two input signals;

ANDing said reference signal with said two input signals for providing outputs of a first polarity when the alteration of relative phase between said two inputs is of a first sense; and ANDing said reference signal with the complements of said input signals to produce outputs of the opposite polarity when the alteration of relative phase of said two input signals is of a second sense.

2. Apparatus for providing phase detection of two input signals comprising in combination:

means for supplying first and second input signal;

means for supplying a reference signal which maintains a constant quadrature phase relationship with respect to said first signal;

first gating means connected to said means for supplying said input and said reference signals for supplying output signals when all of said inputs are of a given predetermined polarity;

means for inverting the waveform of said input signals to be phase detected for providing inverted output signals therefrom;

second gating means connected to said means for supplying said reference and to said means for inverting for receiving therefrom inverted waveform versions of said input signals to be detected, said second gating means providing output signals when all of the input signals supplied thereto are of a predetermined polarity

3. Apparatus as claimed in claim 2 comprising in addition signal combining means connected to said first and second gating means for receiving said output signals thereof for providing a single output the polarity of which is indicative of the sense of the variations of phase of said two input signals with respect to a reference phase relationship.

4. Apparatus as claimed in claim 3 comprising in addition filter means connected to the output of said signal combining means for providing an output indicative in amplitude of the amount of variation of phase of said input signals to be detected and indicative in polarity of the sense of phase variation.

5. Apparatus as claimed in claim 2 wherein said gating means comprises AND gates and comprising in addition signal combining means connected to the outputs of said AND gates for providing a single output indicative in polarity of the sense of phase deviation from a reference phase and indicative in width of the magnitude of phase deviation.

6. Apparatus as claimed in claim 5 wherein said AND gates include means for providing a constant magnitude pulse width increase beyond the time that all signals supplied to said AND gate remain in said predetermined polarity conditions.

7. Apparatus as claimed in claim 6 wherein said means for increasing the output pulse width comprises transistor means which becomes saturated upon the occurrence of said predetermined polarity conditions of input signals supplied to the respective AND gates.

8. Apparatus as claimed in claim 7 comprising in addition capacitive means connected from the collector of said transistor means to a reference potential for enhancing the turn-OFF delay of a transistor in the saturated condition.

* * * * *